Patented Apr. 17, 1945

2,374,127

UNITED STATES PATENT OFFICE 2,374,127

STABILIZATION

Howard R. Peterson, Chicago, Ill., and Frederick H. MacLaren, Munster, Ind., assignors to Standard Oil Company, Chicago, Ill., a corporation of Indiana No Drawing. Application March 30, 1943, Serial No. 481,162

12 Claims. (Cl. 196—17)

This invention relates to paraffin wax compositions. More particularly it relates to paraffin wax compositions having marked high temperature stability and to methods of producing such compositions.

Paraffin waxes or compositions comprising various but generally high proportions of paraffin wax have found extensive use in coating and impregnating paper to be used for wrapping purposes, especially as food wrappers. When either the coating or impregnating technique is used, the paper is passed through a bath containing the molten paraffin wax composition to be applied. In general, it is inadvisable to allow the bath to attain a temperature in excess of about 180° F. to avoid oxidative deterioration of the wax. However, accurate control of the bath temperature cannot always be achieved, with the result that local overheating sometimes brings parts of the bath to temperatures as high as 250 to 300° F. Furthermore, in the preparation of the so-called "dry" wax papers, which are papers whose fibers have been thoroughly impregnated with paraffin wax, the drying rolls must operate at a high temperature, usually in the range of 180 to 225° F., to drive the wax, which has been applied as a surface coating, into the fibers.

In addition it has been found essential to subject wax to a temperature of about 250° F. in order to pulp it with rubber-like materials to produce compositions suitable for paper coating to produce food wrappers.

When paraffin wax or compositions comprising high proportions of paraffin wax are subjected to temperatures in excess of about 200° F., rapid oxidative deterioration of the wax sets in. This deterioration may be estimated by means of a test to be described hereinafter; it manifests itself to the consumer by odor development, color formation, loss in sealing strength, and loss of other desirable properties.

In spite of the fact that paraffin wax reacts slowly with atmospheric oxygen at temperatures below about 180° F., atmospheric oxidation resulting in substantial loss of desirable wax properties proceeds rapidly at temperatures in excess of about 200° F. The problem encountered is aggravated by the fact that chemical stabilizers which are generally effective in inhibiting low temperature atmospheric oxidation of paraffin wax are generally ineffective at high temperatures of about 200° F. and higher.

It is an object of this invention to provide paraffin wax compositions which are stable for long periods of time against atmospheric oxidation at high temperatures of the order of 200° F. or higher, especially at temperatures above about 250° F. Another object of this invention is to provide inhibitors which will stabilize paraffin wax compositions against high temperature atmospheric oxidation. A further object of this invention is to provide processes for securing high temperature stability in paraffin wax compositions.

We have discovered that crude petrolatum waxes of the type obtainable from Salt Creek crude oil may be treated to recover substances which function as inhibitors to prevent oxidation of paraffin wax compositions, particularly at high temperatures. The high temperature inhibitors present in crude petrolatum of the type obtainable from Salt Creek crude oil have been removed and lost by the refining processes used to transform the crude petrolatum into the refined white petrolatum of commerce.

To prepare a crude petrolatum wax, a crude oil of the Salt Creek type may be reduced by distillation to about 40% bottoms, which is treated with concentrated sulfuric acid to remove various impurities, such as nitrogen and sulfur compounds, unsaturated materials and the like. The acid treated bottoms are neutralized and, optionally after further reduction by distillation, diluted with naphtha. The naphtha solution is centrifuged to produce a very crude petrolatum which may be centrifuged again in naphtha solution to produce a crude petrolatum. The crude petrolatum produced by the above process is a yellow micro-crystalline wax having an oil content less than about 10%, and usually in the range of about 2 to about 5%. The melting point of the crude petrolatum wax may vary from about 150 to about 175° F.

Ordinarily crude petrolatum wax is converted to the salable refined state by refining with clays or other adsorbents and/or by extraction with solvents which remove most of the oil, coloring matter and other impurities.

We have found that the addition of about 0.5 to 10% of a Salt Creek type crude petrolatum to a refined paraffin wax exerts a very considerable inhibiting action upon the latter to prevent oxidative deterioration at temperatures in the neighborhood of 200° F. and higher, where ordinary chemical antioxidants for wax fail to function effectively. Crude petrolatum wax of the type obtainable from Salt Creek crude oil contains small amounts of unidentified substances which function as oxidation inhibitors particularly at high temperatures, when added to paraffin wax compositions. The Salt Creek type of petrolatum is quite unique in that relatively small proportions thereof, e. g., less than about 10%, confer high temperature oxidation stability upon compositions comprising substantial proportions of paraffin wax without deleteriously affecting other desirable properties of the refined paraffin wax, such as tensile strength, sealing strength and desirable blocking and scuffing characteristics.

It has been found that a crude petrolatum of the type obtainable from Salt Creek crude oil can be subjected to an adsorption, extraction, centrifuging, fractional precipitation or other fractionation operation to produce concentrates of unidentified substances functioning as high temperature inhibitors of paraffin wax oxidation. The concentrates so produced are much more potent in their antioxidant effect than the crude petrolatum wax from which they were obtained.

In order to prepare a concentrate of inhibitor, the crude petrolatum may be filtered through or otherwise contacted with an adsorbent such as an acid-treated montmorillonite clay, active carbon, silica gel, alumina or the like, either alone or in the presence of a diluent. A suitable diluent is a relatively narrow boiling range paraffinic naphtha, e. g., a virgin paraffinic naphtha boiling in the range of 200–300° F. such as may be fractionated from Salt Creek crude oil. It should be understood that we may use any diluent which will serve practically to dilute the petrolatum and to reduce its viscosity. During the filtration or contacting of the crude petrolatum, the inhibitor is selectively adsorbed by the adsorbent material and may be recovered therefrom by washing with suitable solvents. Suitable solvents for the recovery of the adsorbed inhibitor include B,B'-dichlorodiethylether (Chlorex), furfural, nitromethane, nitrobenzene, phenol, benzol, alcohols, ketones, ethers, chlorinated aliphatic hydrocarbons such as methyl chloride, ethylene dichloride, trichloroethylene, and the like, used separately, successively or in mixtures. We may use the solvent mixtures shown in U. S. Patent 1,805,178. The solvent extract may be treated, e. g., by fractional distillation, to recover solvent for reuse in the process and a concentrate of the inhibitor.

Another method of preparing a concentrate of the inhibitor comprises extracting the crude petrolatum with a selective solvent. We may operate at a temperature sufficient to effect substantial dissolution of the petrolatum, then allow the mass to cool if necessary to effect a separation into raffinate and extract phases which may be separated from each other by known means, such as decantation, centrifuging or filtering. The inhibitor is concentrated in the extract phase. The solvent and the inhibitor dissolved in the extract phase may then be separated, as by distillation, to yield recycle solvent for the extraction process and an inhibitor concentrate. Suitable selective solvents for this process include those which have been mentioned above for the recovery of adsorbed inhibitor from the adsorbent.

The inhibitor may likewise be concentrated by centrifuging a crude petrolatum of the Salt Creek type in a paraffinic naphtha solution. Effluent oil from the centrifuge is stripped of gasoline boiling range hydrocarbons to produce a Centrifuge Oil in which the inhibitor is present in much higher concentration than in the petrolatum from which it was derived.

The concentrate of the inhibitor may be obtained from a crude petrolatum of the Salt Creek type by fractionation with a liquefied normally gaseous hydrocarbon or hydrocarbon mixture, e. g., a refinery propane fraction. An inhibitor concentrate may be obtained by leaching the petrolatum with the liquefied normally gaseous hydrocarbon at relatively low temperatures, e. g., about 0 to about 50° F. with refinery propane, filtering the wax from the solution of inhibitor in the liquefied normally gaseous hydrocarbon and thereafter evaporating the latter to leave the desired concentrate as a residue. Alternatively, the inhibitor concentrate may be produced by fractional precipitation from a liquefied normally gaseous hydrocarbon, suitably refinery propane, under conditions approximating the critical temperature and pressure of the precipitation medium.

Although certain specific methods of obtaining inhibitor concentrates have been described these should not be considered limitative, but merely illustrative. Alternative and equivalent methods will readily suggest themselves to one skilled in the art.

In order to gain a quantitative insight into the rate of oxidative deterioration of paraffin wax compositions at high temperatures, we have used the following test, which we shall refer to hereinafter as the Indiana Peroxide Test.

In this test a wax sample is heated at 250° F. for 40 hours, samples being taken for analysis from time to time. The samples are shaken in an inert atmosphere (nitrogen or carbon dioxide) with a solution of ferrous thiocyanate for a short period and then allowed to settle. The color of the aqueous phase is then compared with the color obtained by adding ammonium thiocyanate to diluted samples of standard ferric chloride. Choosing the solution which gives the same color depth as the test sample (interpolating if necessary) the parts per million of iron in the solution is called the peroxide number of the oil.

The following Indiana Peroxide Test data is adduced to show the effects of specific applications of our invention. All percentages are by weight. In the tests, wax "B" is a refined paraffin wax melting at 135–137° F. T. B. C. is an abbreviation for tertiary butyl catechol which is known to be a low temperature oxidation inhibitor for paraffin wax. Similar results are obtainable by the use of other low temperature oxidation inhibitors. The crude Salt Creek petrolatum was prepared in accordance with the method previously described herein. The Extract Filter Oil was prepared by filtering the crude Salt Creek petrolatum through a bed of clay and washing the used clay with hot naphtha. Wax "C" is a refined paraffin wax melting at 122–124° F. The Centrifuge Oil was prepared by centrifuging a naphtha solution of an oil-bearing crude Salt Creek petrolatum at a temperature below the wax solution temperature therein, and distilling the naphtha from the effluent oil.

In considering the significance of the peroxide numbers obtained by the use of the Indiana Peroxide Test, it has been found that peroxide numbers above about 8–10 at the end of about 10 hours indicate that the paraffin wax composition is no longer salable because of odor and color development and loss of sealing and tensile strength and the loss of other desirable properties. Peroxide numbers not exceeding about 8–10 at the end of 10 hours indicate that the paraffin wax composition may be satisfactorily applied as a coating and impregnating medium.

Table I

| Wax composition | Peroxide numbers after indicated hours of heating | | | | | | | |
|---|---|---|---|---|---|---|---|---|
| | 5 | 10 | 15 | 20 | 25 | 30 | 35 | 40 |
| Wax "B" | 300+ | | | | | | | |
| Wax "B"+0.0001% T. B. C. | 10-12 | 80-90 | 250 | 300+ | | | | |
| Wax "B"+3% crude Salt Creek petrolatum | 6-7 | 7-8 | 10-12 | 25-30 | 30-35 | 40 | 150 | 300+ |
| Wax "B"+0.05% Extract Filter Oil | 4 | 4 | 5 | 5 | 7 | 12 | 35 | 140 |
| Wax "B"+0.3% Extract Filter Oil | 3 | 3 | 3 | 5 | 5 | 5 | 5 | 5 |
| Wax "C"+0.0001% T. B. C. | 7-8 | 300+ | | | | | | |
| Wax "C"+0.0001% T. B. C. + 3% crude Salt Creek petrolatum | 5-6 | 7-8 | 8-9 | 10-11 | 11-12 | 14-15 | 35-40 | 120-130 |
| Wax "C"+0.0001% T. B. C.+0.3% Centrifuge Oil | 5-6 | 7-8 | 8-9 | 9-10 | 9-10 | 9-10 | 11-12 | 25-30 |
| Wax "C"+0.0001% T. B. C.+0.3% Extract Filter Oil | 5-6 | 7-8 | 8-9 | 8-9 | 8-9 | 8-9 | 8-9 | 8-9 |

From the above test data it will be noted that refined paraffin waxes, alone or compounded with a normal proportion of a low-temperature oxidation inhibitor such as tertiary butyl catechol, rapidly deteriorate to a point where they can no longer be used satisfactorily as coating or impregnating agents. The addition of 3% of a crude Salt Creek petrolatum aids considerably in increasing the wax stability but much greater increases in wax stability result from the addition of an inhibitor concentrate such as Centrifuge Oil or Extract Filter Oil.

In general, we have found that about 0.05 to about 3% of our inhibitor concentrates may be added to paraffin waxes to secure satisfactory high temperature stability. However, somewhat higher or lower proportions of inhibitor concentrate may be used, depending on the character of the paraffin wax composition, the contemplated conditions for use of the paraffin wax composition, the nature of the specific inhibitor concentrate and the degree of stability to oxidative deterioration which it is desired to impart.

It is apparent that we have discovered paraffin wax compositions characterized by their oxidative stability at high temperatures, and processes for making same. We have also discovered high temperature oxidation inhibitors for paraffin wax compositions and methods for their production.

We claim:

1. A composition of matter comprising a paraffin wax and an oxidation inhibitor separated as an impurity from a crude petrolatum, said oxidation inhibitor being ineffective substantially to increase the tensile strength of the said paraffin wax.

2. A composition of matter comprising a paraffin wax normally subject to oxidative deterioration at temperatures above about 200° F. and an inhibitor for said oxidative deterioration derived from a crude petrolatum and substantially free of refined petrolatum, the tensile strength of the said paraffin wax not being substantially increased by the presence of the said oxidation inhibitor.

3. A composition of matter comprising a paraffin wax normally subject to oxidative deterioration at temperatures above about 200° F. and an inhibitor for said oxidative deterioration separated as an impurity from a crude petrolatum, said inhibitor being present in a small but sufficient proportion to inhibit said oxidative deterioration without increasing substantially the tensile strength of the said paraffin wax.

4. A composition of matter comprising a paraffin wax and an oxidation inhibitor separated as an impurity from a crude petrolatum of the type obtainable from Salt Creek crude oil said oxidation inhibitor being ineffective substantially to increase the tensile strength of the said paraffin wax.

5. A composition of matter comprising a paraffin wax and about 0.05 to about 3% of an oxidation inhibitor concentrate prepared from a crude petrolatum of the type obtainable from Salt Creek crude oil, the tensile strength of the said paraffin wax not being substantially increased by the presence of the said oxidation inhibitor.

6. A composition of matter comprising a paraffin wax and an oxidation inhibitor prepared from a crude petrolatum of the type obtainable from Salt Creek crude oil by treatment with an adsorbent material followed by extraction of the said adsorbent material with a solvent to segregate said oxidation inhibitor, said oxidation inhibitor being ineffective substantially to increase the tensile strength of the said paraffin wax.

7. A process for stabilizing a composition of matter comprising a substantial proportion of a paraffin wax, comprising adding to said composition of matter between about 0.3% and about 5.0% of a crude petrolatum of the type obtainable from Salt Creek crude oil.

8. A composition of matter comprising a paraffin wax and an oxidation inhibitor derived from a crude petrolatum of the type obtainable from Salt Creek crude oil by centrifugal fractionation, said oxidation inhibitor being substantially free of refined petrolatum and ineffective substantially to increase the tensile strength of the said paraffin wax.

9. A composition of matter comprising a paraffin wax and an oxidation inhibitor separated as an impurity from a crude petrolatum of the type obtainable from Salt Creek crude oil by fractionation with a normally gaseous liquefied hydrocarbon, said oxidation inhibitor being ineffective substantially to increase the tensile strength of the said paraffin wax.

10. A process of stabilizing a composition of matter comprising a substantial proportion of a paraffin wax, comprising incorporating in said composition of matter an oxidation inhibitor derived from a crude petrolatum.

11. The process of claim 10 where the crude petrolatum is of the type obtainable from Salt Creek crude oil.

12. A process of stabilizing a composition of matter comprising a substantial proportion of a paraffin wax, comprising adding to said composition of matter between about 0.05 and about 3% of an oxidation inhibitor derived from a crude petrolatum of the type obtainable from Salt Creek crude oil.

HOWARD R. PETERSON.
FREDERICK H. MacLAREN.